(12) United States Patent
Saewong et al.

(10) Patent No.: US 7,930,565 B2
(45) Date of Patent: Apr. 19, 2011

(54) POWER-OPTIMIZING MEMORY ANALYZER, METHOD OF OPERATING THE ANALYZER AND SYSTEM EMPLOYING THE SAME

(75) Inventors: Saowanee Saewong, Dallas, TX (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 758 days.

(21) Appl. No.: 11/853,674

(22) Filed: Sep. 11, 2007

(65) Prior Publication Data

US 2008/0098243 A1    Apr. 24, 2008

Related U.S. Application Data

(60) Provisional application No. 60/825,235, filed on Sep. 11, 2006.

(51) Int. Cl.
*G06F 1/00* (2006.01)
*G06F 1/26* (2006.01)
*G06F 1/32* (2006.01)
*G06F 9/46* (2006.01)

(52) U.S. Cl. ........ 713/300; 713/320; 718/100; 718/102; 718/104

(58) Field of Classification Search .................. 713/300, 713/320; 718/100, 102, 104, 107, 108
See application file for complete search history.

(56) References Cited

U.S. PATENT DOCUMENTS

| 5,148,546 | A * | 9/1992 | Blodgett | 713/320 |
| 6,751,739 | B1 * | 6/2004 | Verdun | 713/300 |
| 7,206,960 | B2 * | 4/2007 | Barr et al. | 713/600 |
| 7,454,639 | B2 * | 11/2008 | Jain et al. | 713/324 |
| 7,539,994 | B2 * | 5/2009 | McAlinden et al. | 718/104 |

OTHER PUBLICATIONS

Gary Nutt, Operating Systems: A Modern Perspective, 2000, Second Ed., Addison-Wesley, pp. 293-298.*

* cited by examiner

*Primary Examiner* — Mark Connolly
(74) *Attorney, Agent, or Firm* — Ronald O. Neerings; Wade James Brady, III; Frederick J. Telecky, Jr.

(57) ABSTRACT

Embodiments of the present disclosure provide a power-optimizing memory analyzer, a method of operating a power-optimizing memory analyzer and a memory system employing the analyzer or the method. In one embodiment, the power-optimizing memory analyzer is for use with an array of memory blocks and includes a task database configured to provide a parameter set corresponding to each of a set of tasks to be performed in a system. The power-optimizing memory analyzer also includes an allocation module configured to determine offline, a group of memory blocks in the array corresponding to the parameter set for each task and based on providing a power reduction for the array. The power-optimizing memory analyzer further includes a power profiling module configured to generate run-time power profiles of memory power states for each task allowing transparent and dynamic control of the memory power states while maintaining a required quality of service.

24 Claims, 3 Drawing Sheets

US 7,930,565 B2

POWER-OPTIMIZING MEMORY ANALYZER, METHOD OF OPERATING THE ANALYZER AND SYSTEM EMPLOYING THE SAME

CROSS-REFERENCE TO PROVISIONAL APPLICATION

This application claims the benefit of U.S. Provisional Application No. 60/825,235 entitled "System-on-Chip Task Scheduling That Dynamically Selects The Optimal Combination MEM Power Management Techniques Based on Task Memory Profiling Data" to Saowanee Saewong and Xiaolin Lu, filed on Sep. 11, 2006, which is incorporated herein by reference in its entirety.

TECHNICAL FIELD OF THE DISCLOSURE

The present disclosure is directed, in general, to memory systems and, more specifically, to a power-optimizing memory analyzer, a method of operating a power-optimizing memory analyzer and a memory system employing the analyzer or the method.

BACKGROUND OF THE DISCLOSURE

A major trend, especially in portable electronic devices, is towards smaller physical sizes using wireless communications and multimedia processing. This situation typically requires increased computing power to supply the feature-rich functionality needed. CMOS circuits can play a dominant role in such devices, which are often integrated to the point of having a complete system on a chip (SoC). These SoC-based devices are growing in complexity and speed requirements while at the same time shrinking in physical size thereby generating increased reliability issues. Although current devices are providing reliable operation, further improvements would prove beneficial in the art.

SUMMARY OF THE DISCLOSURE

Embodiments of the present disclosure provide a power-optimizing memory analyzer, a method of operating a power-optimizing memory analyzer and a memory system employing the analyzer or the method. In one embodiment, the power-optimizing memory analyzer is for use with an array of memory blocks and includes a task database configured to provide a parameter set corresponding to each of a set of tasks to be performed in a system. The power-optimizing memory analyzer also includes an allocation module configured to determine offline, a group of memory blocks in the array corresponding to the parameter set for each task and based on a power reduction for the array.

In another aspect, the method includes providing a parameter set corresponding to each of a set of tasks to be performed in a system and determining offline, a group of memory blocks in an array corresponding to the parameter set for each task and based on a power reduction for the array.

The memory system includes an array of memory blocks, a run-time power controller and applications and operating system software, which are coupled to the array of memory blocks and the run-time power controller that correspond to a set of tasks to be performed. The memory system also includes a power-optimizing memory analyzer having a task database that provides a parameter set corresponding to each of the set of tasks. The power-optimizing memory analyzer also has an allocation module that determines offline a group of memory blocks in the array, corresponding to the parameter set for each task and based on a power reduction for the array of memory blocks. The power-optimizing memory analyzer further has a power profiling module that generates a run-time power profile of memory power states for coordination with the run-time power controller in scheduling each group of memory blocks during run time, based on maintaining a quality of service for the system.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Embodiments of the present disclosure provide a collaborated and systematic approach that organizes memory layout and controls memory power states to conserve memory power. This is accomplished both transparently and dynamically with a focus on maintaining quality of service for a system. The task-based approach of memory management employed in the embodiments illustrated below addresses current issues. For example, single large memory blocks typically result in generally higher memory access power, while a multiplicity of memory blocks often results in standby power that dramatically increases at elevated ambient temperatures. Putting memory into retention reduces system performance due to overhead time needed to achieve activation. Having to power down memory may break system integrity due to lost content.

Figure 1:
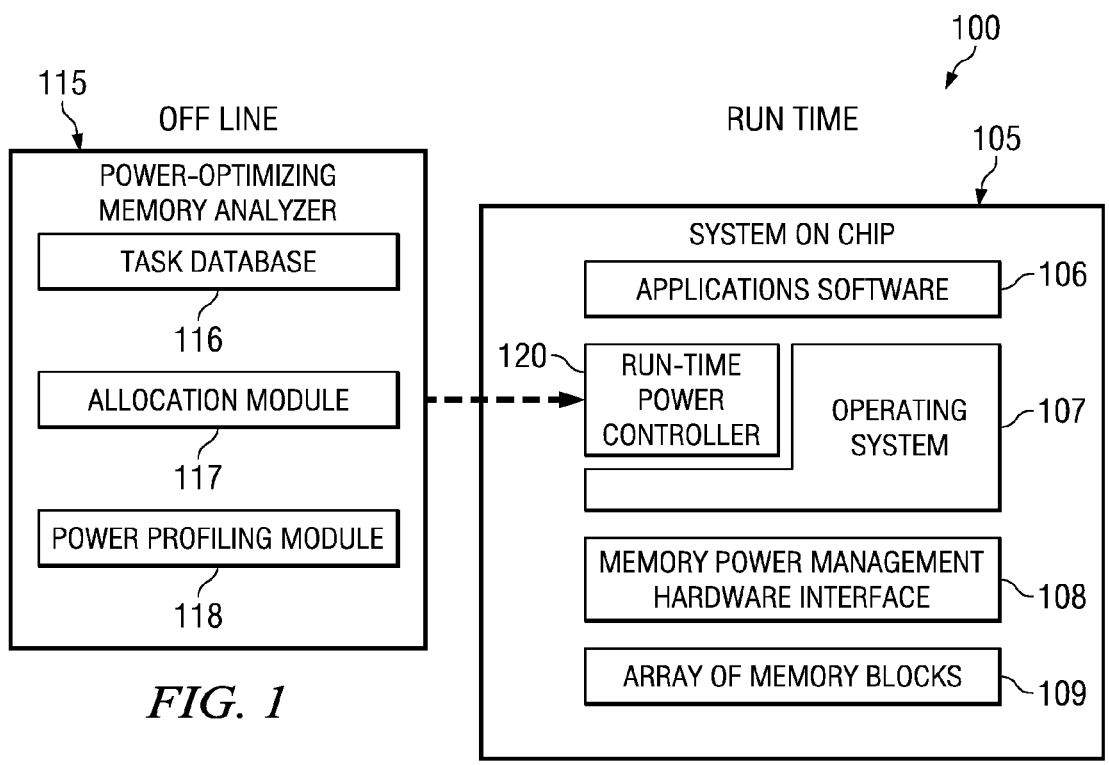
FIG. 1 illustrates a block diagram of a memory system as provided by one embodiment of the disclosure.

FIG. 1 illustrates a block diagram of a memory system 100 as provided by one embodiment of the disclosure. The illustrated embodiment of the memory system 100 includes a System on a Chip (SoC) 105, which is a run-time portion and a power-optimizing memory analyzer 115, which is an off-line portion. The SoC 105 includes applications software 106, operating system software 107, a memory power management hardware interface 108 and an array of memory blocks 109. The SoC 105 also includes a run-time power controller 120 that utilizes information from run-time power profiles that are generated by the power-optimizing memory analyzer 115. The power-optimizing memory analyzer 115 includes a task database 116, an allocation module 117 and a power profiling module 118.

The applications and operating system software 106, 107 orchestrate a set of tasks that are accomplished by the SoC 105 in delivering a collection of features and functions. The run-time power controller 120 is coupled to the memory power management hardware interface 108 and the operating system software 107 to provide control of the array of memory blocks 109 corresponding to the set of tasks.

The task database 116 provides a parameter set corresponding to each of the set of tasks. The parameter set typically includes a plurality of parameters needed by the allocation module 117. For example, a memory block specification for each type of memory block that is used by the Soc 105 is included. Of interest are the various power requirements and response times associated with each type of memory block. Of particular interest is the overhead time needed to switch between various memory power states that may be employed. Additionally, the parameter set includes application memory map files and software objects associated with each task.

The allocation module 117 provides an offline determination of a group of memory blocks in the array of memory blocks 109 corresponding to the parameter set for each task. Selection of this particular group of memory blocks is based on providing a power reduction that may be achieved for the array. In making the determination, the allocation module 117 analyzes the period of time that each task is going to run, and what types of memory are required while the task is running. This is based on the application memory map files and software objects associated with each task. Additionally, a determination is made as to the amount of time spent reading from and writing to a memory block for each task.

These are key parameters for the allocation module 117 in determining memory power states and overall power estimations for each of the types of memory blocks used by the set of tasks. Additionally, the allocation module 117 provides a memory power savings by reducing the number of memory blocks needed for a task by grouping like software objects for each task.

Figure 2:
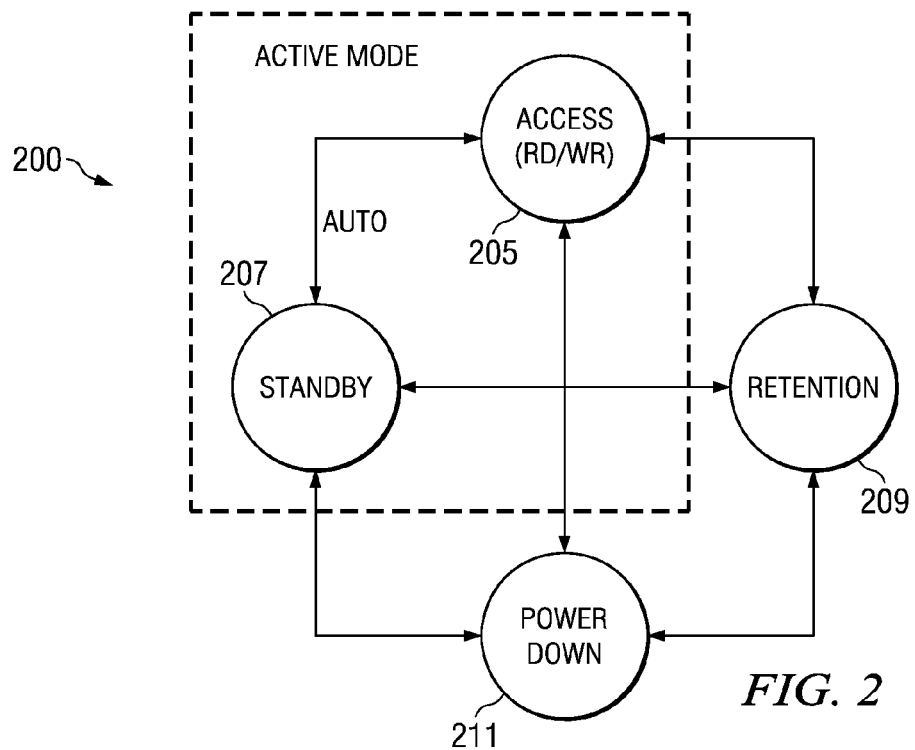
FIG. 2 illustrates a diagram of memory power states as provided by one embodiment of the disclosure.

FIG. 2 illustrates a diagram of memory power states 200 as provided by one embodiment of the disclosure. The memory power states 200 include an access mode 205, a standby mode 207, a retention mode 209 and a power down mode 211 for the group of memory blocks determined by an allocation module such as the allocation module of FIG. 1. The access mode 205 provides full power to a memory block and is needed to read from and write to the memory block at full performance speeds.

The standby mode 207 provides a power savings over the access mode while the memory block is not being accessed. A power level for the standby mode 207 is determined such that the access mode 205 may be provided transparently to the processing of a task that needs memory block access. Therefore, the power savings afforded by the standby mode 207 is usually small, although not negligible. The combination of the access and standby modes 205, 207 working together is called an active mode of the memory block, since there is an automatic transitioning from the standby mode 207 to the access mode 205 when access is required.

The retention mode 209 provides a memory block power level that only allows retaining memory states for the memory block thereby providing even greater power savings. Moving from the retention mode 209 requires a longer transition time than from the standby mode 207 to the access mode 205. Consequently, transitioning from the retention mode 209 to the access mode 205 requires an even longer transition time.

The power down mode 211 removes all power from the memory block and provides maximum power savings. Transitioning to the retention, standby or access modes 209, 207, and 205 requires increasingly longer transition times.

Figure 3A:
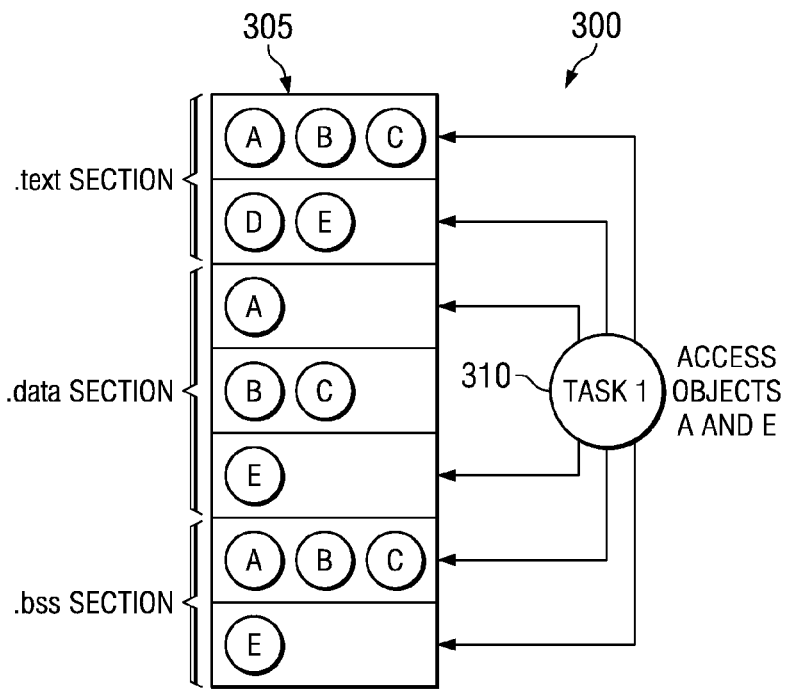
FIGS. 3A and 3B respectively illustrate a traditional memory layout organization and a power-efficient, task-based memory layout organization as may be selected by an allocation module.
Figure 3B:
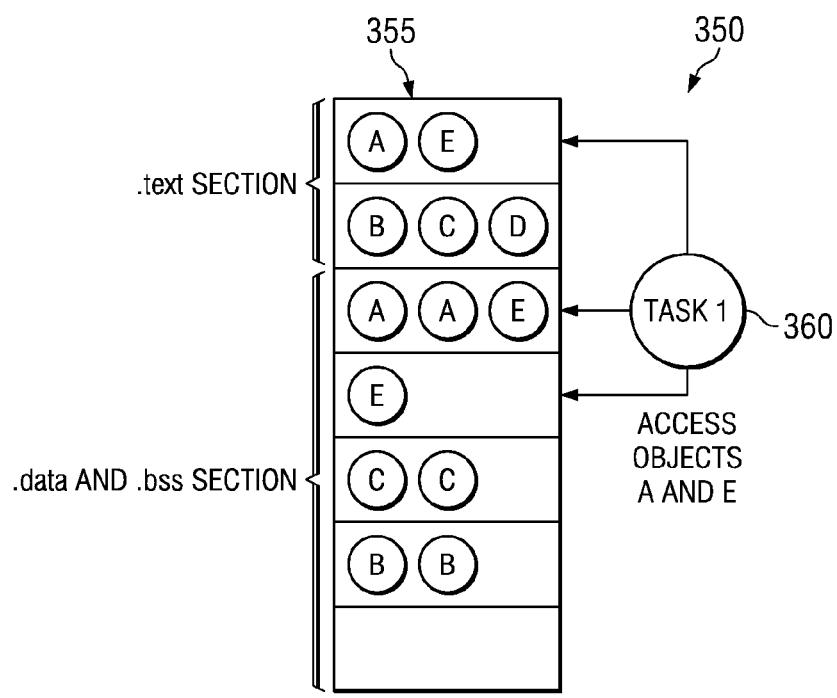

FIGS. 3A and 3B respectively illustrate a traditional memory layout organization 300 and a power-efficient, task-based memory layout organization 350 as may be selected by an allocation module such as the one discussed in FIG. 1. A portion of the estimated power savings determined by the allocation module corresponds to a grouping of like software objects for each task in the group of memory blocks.

The memory layout organization 300 includes a collection of seven memory blocks 305 having a collection of software objects corresponding to a task 1, as shown. The memory blocks 305 correspond to three different memory usages (i.e., .text, .data and .bss). Task 1 is required to access the software objects A and E, thereby requiring six of the seven memory blocks to be accessed. The memory layout organization 300 is typical of one where memory power is not an issue and constantly resides at the access mode level.

The memory layout organization 350 also includes a collection of seven memory blocks 305 having a collection of software objects corresponding to the task 1, as shown. However, the task-based memory layout organization 355 places the required software objects A and E into only a group of three of the seven memory blocks. This allows four of the seven memory blocks to be placed in either the retention or power down modes as described in FIG. 2, thereby providing a power savings. Additionally, the three active mode memory blocks containing the software objects A and E may also provide a power savings in the standby mode until they are being accessed.

Returning to FIG. 1, the allocation module 117 employs knowledge of the various memory power states and transition times as well as the task-based memory layout organizations to provide a schedulability analysis of the group of memory blocks corresponding to run-time constraints. The power profiling module 118 then generates the run-time power profile of memory allocations and power states for coordination with the applications and operating system softwares 106, 107 by means of the run-time power controller 120. The run-time power controller 120 is employed in scheduling each group of memory blocks during run time, based on maintaining a quality of service for the Soc 105. In the illustrated embodiment, a change in memory power states for the group of memory modules occurs at context switching of a task.

Figure 4:
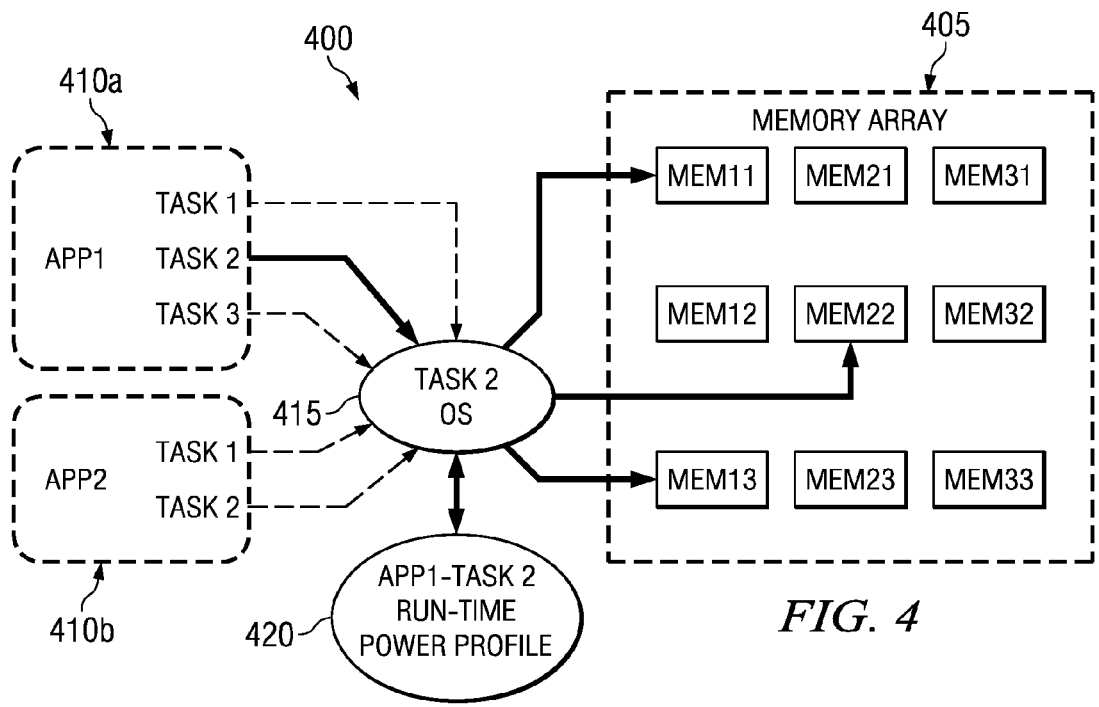
FIG. 4 illustrates a diagram of a run-time operation employing power profiling.

FIG. 4 illustrates a diagram of a run-time operation 400 employing power profiling. The run-time operation 400 includes a memory array 405, first and second applications 410a, 410b, operating software 415 and a run-time power profile 420. The memory array 405 includes a collection of memory blocks $MEM_{11}$-$MEM_{33}$. The columns of memory blocks correspond to three different types of memory, and the rows correspond to three different memory usages, as was shown in FIGS. 3A and 3B.

Task 2 of the first application 410a is currently running and requires a group of memory blocks $MEM_{11}$, $MEM_{13}$, $MEM_{22}$, as shown. These memory blocks contain the software objects required to run task 2 and reflect the type of task-based memory layout organization discussed with respect to FIG. 3B. This memory layout is dictated by the run-time power profile 420 for task 2 of the first application 410a. The group of memory blocks $MEM_{11}$, $MEM_{13}$, $MEM_{22}$ has been placed in the active power state while the power state of the remaining memory blocks is either in the retention mode or the power down mode. At the completion of task 2 of the first application 410a, the operating system 415, in corporation with the direction of the run-time power profile 420, will select another group of memory blocks and appropriate power levels for the next task to run based on its run-time power profile.

Figure 5:
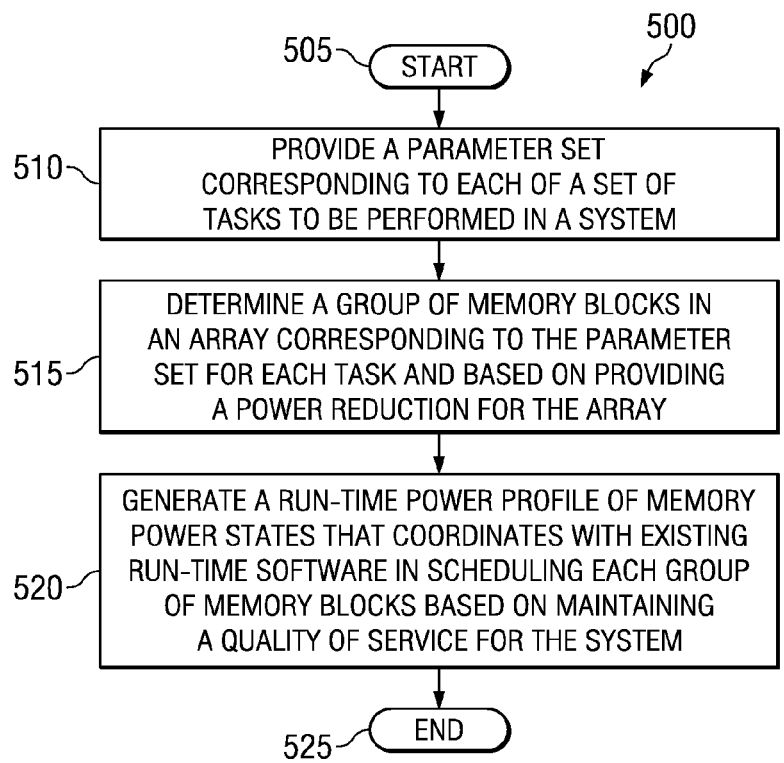
FIG. 5 illustrates a flow diagram of an embodiment of a method of operating a power-optimizing memory analyzer carried out in accordance with the principles of the present disclosure.

FIG. 5 illustrates a flow diagram of an embodiment of a method 500 of operating a power-optimizing memory analyzer carried out in accordance with the principles of the present disclosure. The method 500 starts in a step 505 and is for use with an array of memory blocks. Then, in a step 510, a parameter set corresponding to each of a set of tasks to be performed in a system is provided. The parameter set includes, for example, memory block specifications wherein the specifications provide overhead times needed to power up each of the types of memory blocks that may be employed. The parameter set also includes application memory map files as well as software objects associated with each task.

A group of memory blocks in the array corresponding to the parameter set for each task is determined offline. The selection of the group of memory blocks is based on providing a power reduction for the array of memory blocks that may be achieved when the group is employed in accomplishing the task. A portion of the estimated power saving corresponds to selecting memory power states for the group of memory blocks. In one embodiment, the memory power states correspond to an access mode, a standby mode, a retention mode and a power down mode of operating the group of memory blocks. Additionally, a portion of the estimated power savings corresponds to a grouping of like software objects for each task in the group of memory blocks. A schedulability analysis of the group of memory blocks corresponding to run-time constraints of the system is also determined in the step 515.

This schedulability analysis is employed in a step 520 to generate a run-time power profile of memory power states. The run-time power profile coordinates with existing run-time software in scheduling each group of memory blocks based on maintaining a quality of service for the system. A change in memory power states for the group of memory blocks occurs at context switching of a task. The method 500 ends in a step 525.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which the disclosure relates will appreciate that other and further additions, deletions, substitutions and modifications may be made to the described example embodiments without departing from the disclosure.

What is claimed is:

1. A power-optimizing memory analyzer for use with an array of memory blocks, comprising:
   a task database configured to provide a parameter set corresponding to each of a set of tasks to be performed in a system; and
   an allocation module configured to determine offline a group of memory blocks in the array corresponding to the parameter set for each task and based on providing a power reduction for the array;
   wherein a portion of the power reduction corresponds to a grouping of like software objects for each task in the group of memory blocks.

2. The analyzer as recited in claim 1 wherein the parameter set includes parameters selected from the group consisting of:
   memory block specifications;
   application memory map files for each task; and
   software objects for each task.

3. The analyzer as recited in claim 1 wherein a further portion of the power reduction corresponds to selecting memory power states for the group of memory blocks from the group consisting of:
   an access mode;
   a standby mode;
   a retention mode; and
   a power down mode.

4. The analyzer as recited in claim 1 wherein the allocation module is further configured to provide a schedulability analysis of the group of memory blocks corresponding to run-time constraints of the system.

5. The analyzer as recited in claim 1 further comprising
   a power profiling module configured to generate a run-time power profile of memory power states that coordinates with existing run-time software in scheduling each group of memory blocks based on maintaining a quality of service for the system.

6. The analyzer as recited in claim 5 wherein a change in memory power states for the group of memory blocks occurs at context switching of a task.

7. A method of operating a power-optimizing memory analyzer for use with an array of memory blocks, comprising:
   providing a parameter set corresponding to each of a set of tasks to be performed in a system; and
   determining offline a group of memory blocks in the array corresponding to the parameter set for each task and based on providing a power reduction for the array;
   wherein a portion of the power reduction corresponds to a grouping of like software objects for each task in the group of memory blocks.

8. The method as recited in claim 7 wherein the parameter set includes parameters selected from the group consisting of:
   memory block specifications;
   application memory map files for each task; and
   software objects for each task.

9. The method as recited in claim 7 wherein a further portion of the power reduction corresponds to selecting memory power states for the group of memory blocks from the group consisting of:
   an access mode;
   a standby mode; a retention mode; and
   a power down mode.

10. The method as recited in claim 7 wherein the determining provides a schedulability analysis of the group of memory blocks corresponding to run-time constraints of the system.

11. The method as recited in claim 7 further comprising
    generating a run-time power profile of memory power states that coordinates with existing run-time software in scheduling each group of memory blocks based on maintaining a quality of service for the system.

12. The method as recited in claim 11 wherein a change in memory power states for the group of memory blocks occurs at context switching of a task.

13. A memory system, comprising:
    an array of memory blocks;
    a run-time power controller;
    applications and operating system software, coupled to the array of memory blocks and run-time power controller, that correspond to a set of tasks to be performed; and
    a power-optimizing memory analyzer, including:
    a task database that provides a parameter set corresponding to each of the set of tasks, an allocation module that determines offline a group of memory blocks in the array corresponding to the parameter set for each task and based on a power reduction for the array of memory blocks, and a power profiling module that generates a run-time power profile of memory power states for coordination with the run-time power controller in scheduling each group of memory blocks during run time, based on maintaining a quality of service for the system;

wherein a portion of the power reduction corresponds to a grouping of like software objects for each task in the group of memory blocks.

14. The system as recited in claim 13 wherein the parameter set includes parameters selected from the group consisting of:

memory block specifications;
application memory map files for each task; and
software objects associated with each task.

15. The system as recited in claim 13 wherein a further portion of the power reduction corresponds to selecting memory power states for the group of memory blocks from the group consisting of: an access mode; a standby mode; a retention mode; and a power down mode.

16. The system as recited in claim 13 wherein the allocation module further provides a schedulability analysis of the group of memory blocks corresponding to run-time constraints.

17. The system as recited in claim 13 wherein a change in memory power states for the group of memory blocks occurs at context switching of a task.

18. A method of allocating physical memory in a computing system, comprising the steps of:

identifying parameters corresponding to a task to be executed by the computing system, the parameters comprising:

power requirement parameters associated with each of a plurality of memory blocks in the system; and parameters corresponding to application memory map files and software objects associated with the task;

selecting a group of the plurality of memory blocks corresponding to the identified parameters for the task, for placement of software objects associated with the task; and forwarding information corresponding to the selected group of memory blocks to a power controller of the computing system for use during execution of the task.

19. The method of claim 18, wherein the identifying step comprises retrieving the parameters from a parameter database.

20. The method of claim 18, wherein the forwarded information comprises a schedule of power states for the plurality of memory blocks.

21. The method of claim 20, wherein the power requirement parameters associated with each of the plurality of memory blocks comprise parameters corresponding to power states in which the corresponding memory blocks can be operated, the power states including an active power state and a power down power state;

and wherein the forwarded information indicates that one or more memory blocks not included in the group of memory blocks are to be placed in the power down power state during execution of the task.

22. The method of claim 21, wherein the selecting step is performed in such a manner as to minimize the number of memory blocks in the active power state.

23. The method of claim 21, further comprising:

generating a run-time profile comprising the scheduling of the group of memory blocks to maintain a desired quality of service by the computing system; and forwarding the run-time profile to the power management controller for use during execution of the task.

24. The method of claim 18, wherein the identifying, selecting, and forwarding steps are repeated for each of a plurality of tasks.

* * * * *